United States Patent [19]

Brealey et al.

[11] Patent Number: 6,044,217
[45] Date of Patent: Mar. 28, 2000

[54] HIERARCHICAL METADATA STORE FOR AN INTEGRATED DEVELOPMENT ENVIRONMENT

[75] Inventors: Christopher L. Brealey, North York; Jeffrey G. Johnston, Scarborough; Vladimir Klicnik, Oshawa; David M. Lauzon, Etobicoke; Lok T. Loi, East York; Dirk A. Seelemann, II, Thornhill, all of Canada

[73] Assignee: International Business Machines Corporation, Armonk, N.Y.

[21] Appl. No.: 08/956,413

[22] Filed: Oct. 23, 1997

[30] Foreign Application Priority Data

Mar. 27, 1997 [CA] Canada ................................. 2201278

[51] Int. Cl.7 .............................. G06F 9/06; G06F 9/44
[52] U.S. Cl. ....................... 395/701; 707/103; 707/104
[58] Field of Search ........................... 395/701; 707/103, 707/102, 104, 1

[56] References Cited

U.S. PATENT DOCUMENTS

| 5,404,525 | 4/1995 | Endicott et al. | 395/712 |
| 5,644,771 | 7/1997 | Endicott et al. | 395/712 |
| 5,761,509 | 6/1998 | Danforth et al. | 395/701 |
| 5,864,862 | 1/1999 | Kriens et al. | 707/103 |

OTHER PUBLICATIONS

Aarsten et al, "Designing concurrent and distributed control systems," Communications of the ACM, vol. 39, No. 10, pp. 50–58, Oct. 1996.

Forman et al, "Composition of before/after metaclasses in SOM," ACM SIGPLAN Notices, Proceedings of the ninth annual conference on OOPSLA '94, vol. 29, No. 10, pp. 427–439, Oct. 1994.

Danforth et al, "Reflections on metaclass programming in SOM," ACM SIGPLAN Notices, Proceedings of the ninth annual conference on OOPSLA '94, vol. 29, No. 10, pp. 440–452, Oct. 1994.

IBM SOMobjects Developer Toolkit—User Guide, Version 2.0, "An introductory guide to the System Object Model and its accompanying frameworks,", pp.i–xiii, Chp. 1–2, 4, 6 & 10, Jun. 1993.

*Primary Examiner*—Tariq R. Hafiz
*Assistant Examiner*—Tuan Q. Dam
*Attorney, Agent, or Firm*—Whitham, Curtis & Whitham; Jay P. Sbrollini

[57] ABSTRACT

A metadata repository for use in an integrated development environment is provided. The metadata repository is layered to define levels of common behaviour useful to different types of application development tools. The most general use tools have access to metadata at the level of simple constructed types; more specialised tools have access to components that contain properties of a target language; highly specialised tools have access to composed partitionable part metadata that can be used for constructing distributed applications.

18 Claims, 3 Drawing Sheets

FIG. 3

```cpp
class DMIDEElement : public DMBASE
{
public:

// Methods to query/manipulate content.

class CotentCursor : public DMKeyedOrderedCursor
{
public:
    virtual ~CotentCursor () {}
    virtual Boolean isLinked () const = 0;
    virtual DMIDEElement const& element () const = 0;
};
DMIDEElement::ContentCursor* newCursor ();
Boolean hasContent () const;
unsigned int numberOfElements () const;
DMIDEElement& elementAt ( const DMIDEElement::ContentCursor& curs ) const;
DMIDEElement& elementWithKey ( const IString& key ) const;
DMIDEElement* findElementWithKey ( const IString& key ) const;

// Methods to access/change icon or bitmap.

DMResource getIcon () const;
void setIcon ( DMResource const& resource );
DMResource getBitmap () const;
void setBitmap ( DMResource const& resource );

// Methods to allow tools to determine if/how content
// is manipulated.

virtual Boolean canOwn ( DMIDEElement& elem ) const = 0;
virtual Boolean canLink ( DMIDEElement& elem ) const = 0;
virtual Boolean canRemove ( DMIDEElement& elem ) const;
virtual Boolean canMove ( DMIDEElement& elem ) const;

// Methods to manipulate content.

virtual void move ( DMIDEElement& fromParent,
    DMIDEElement& toParent,
    Boolean own,
    Boolean autoLocking = true );
void ownAsFirst ( DMIDEElement& elem );
void ownAsNext ( DMIDEElement& elem, DMIDEElement::ContentCursor& curs );
void linkAsFirst ( DMIDEElement& elem );
void linkAsNext ( DMIDEElement& elem, DMIDEElement::ContentCursor& curs );
Boolean remove ( DMIDEElement& elem );
void remove ( DMIDEElement::ContentCursor& curs );
Boolean remove ( const IString& key );

// Methods to query or manipulate associated files.

Boolean hasFiles () const;
void associateFile ( DMFile& file );
DMFile& fileAt ( const lCursor& curs ) const;
lCursor* createFileCursor () const;

// Methods to invoke, enable, disable associated
// toolactions.

void disableToolAction ( DMToolAction& action ) const;
void enableToolAction ( DMToolAction& action ) const;
long perform ( DMToolAction& action, DMSearchCritter const& context );
virtual Boolean canEdit () const;
virtual void edit( DMSearchCritter const& context );

// Method to indicate if tree element is to be shown in the tree.

virtual Boolean isVisible () const;

// Method to allow and invoke code generation.

virtual void generate ( DMSearchCritter const& context );
virtual Boolean canGenerate () const;

// Methods to query, manipulate the dirtiness state of the
// tree element object.

void setDirty ( Boolean dirty = true );
void resetDirty () { setDirty(false) };
Boolean isDirty () const;

};
```

HIERARCHICAL METADATA STORE FOR AN INTEGRATED DEVELOPMENT ENVIRONMENT

CROSS REFERENCE TO RELATED APPLICATION

This application is related in subject matter to our copending U.S. patent application Ser. No. 08/950,117, filed on Oct. 14, 1997, for "An Object Oriented Framework Mechanism Providing Common Object Relationship and Context Management for Multiple Tools", the disclosure of which is incorporated herein by reference.

BACKGROUND OF THE INVENTION

1. Field of the Invention

The present invention generally relates to the data processing field, and more specifically to the provision of an integrated tool development environment.

2. Background Description

Traditional tool development follows the simple steps of creating the text-based source code, and then compiling and executing the code on a specific platform. The increasing complexity of function and integration of tools over multiple platforms means that tool development cannot generally be performed by small groups of human developers. Often the only way to produce a fully functioning application is to make use of specially-designed application development tools in order to build other tools. Today's applications are built using a mix of low level tools such as source editors and debuggers, along with high level builders of user interface, data access, distribution support, and code generators. The applications built in such environments are targeted to run in a multiplicity of execution environments, on various hardware platforms, supporting many distribution mechanisms and data access mechanisms. Developing such applications in the current "state of the art" requires the use of multiple different tools for multiple different vendors, each solving a piece of the over all puzzle.

The ideal is to provide an integrated development environment (IDE) in which information provided by each tool during program development can be shared with other tools, particularly those being used in the same development effort, to avoid duplication and inconsistent interface and function operations. Currently available development tools address only a small subset of this requirement. They typically focus on a source-level, single targeted application, and use a simple file system folder/directory model for their information.

Where the application development tools are tightly integrated, they can often use cross reference tables to share information about the program under development. However in an incremental development environment, the tables can be out of synch with the source code, and frequently contain less information than implied by the source code.

Also, any tool not closely integrated (and this is often the case with tools from different manufacturers) will have to parse the source or the tables, provided the programming language is not a barrier. This parsing exposes the tool either to parsing differences or internal table definitions.

SUMMARY OF THE INVENTION

One of the key problems that needs to be addressed during construction of an IDE for a complex application is the ability of the various IDE tools and components to share information in a meaningful way. An "information store" is required to facilitate this sharing. Such a store must support usage and access characteristics of a multi tool/multi user environment and provide a flexible basis for capturing required semantic information.

The store must also define an overall information structure about applications under development, and organize it in a way that offers the degrees of freedom required by today's applications. These degrees of freedom include choices of targets, languages, component models, distribution, etc. The IDE further needs to define a model for sharing common application semantics among the cooperating tools, but at the same time allow individual tools to extend the shared information with private tool data. The model also need to "manage" programming "element" naming issues (naming scopes) across the various domains implied by the degrees of freedom.

Therefore, an object of the present invention is to provide a mechanism for organizing metadata in support of the development of complex enterprise applications by defining a layered data model for handling application development metadata, addressing the various application degrees of freedom within a single metadata store.

In accordance with these objects, the present invention provides a metadata container for common access tool data in an object oriented programming environment. The metadata container has a hierarchical structure that consists of simple constructed types containing subparts and encapsulated behaviour, components containing properties of a target language, and composed parts permitting partitioning for distribution.

The present invention also provides a metadata store for common access tool data in a object oriented programming environment consisting of a single base class defining common behaviour for elements in the tool data, and separate abstract class hierarchies, inheriting from the single base class, to define name scope and containment for tool data.

BRIEF DESCRIPTION OF THE DRAWINGS

The foregoing and other objects, aspects and advantages will be better understood from the following detailed description of a preferred embodiment of the invention with reference to the drawings, in which.

and

Figure 1:
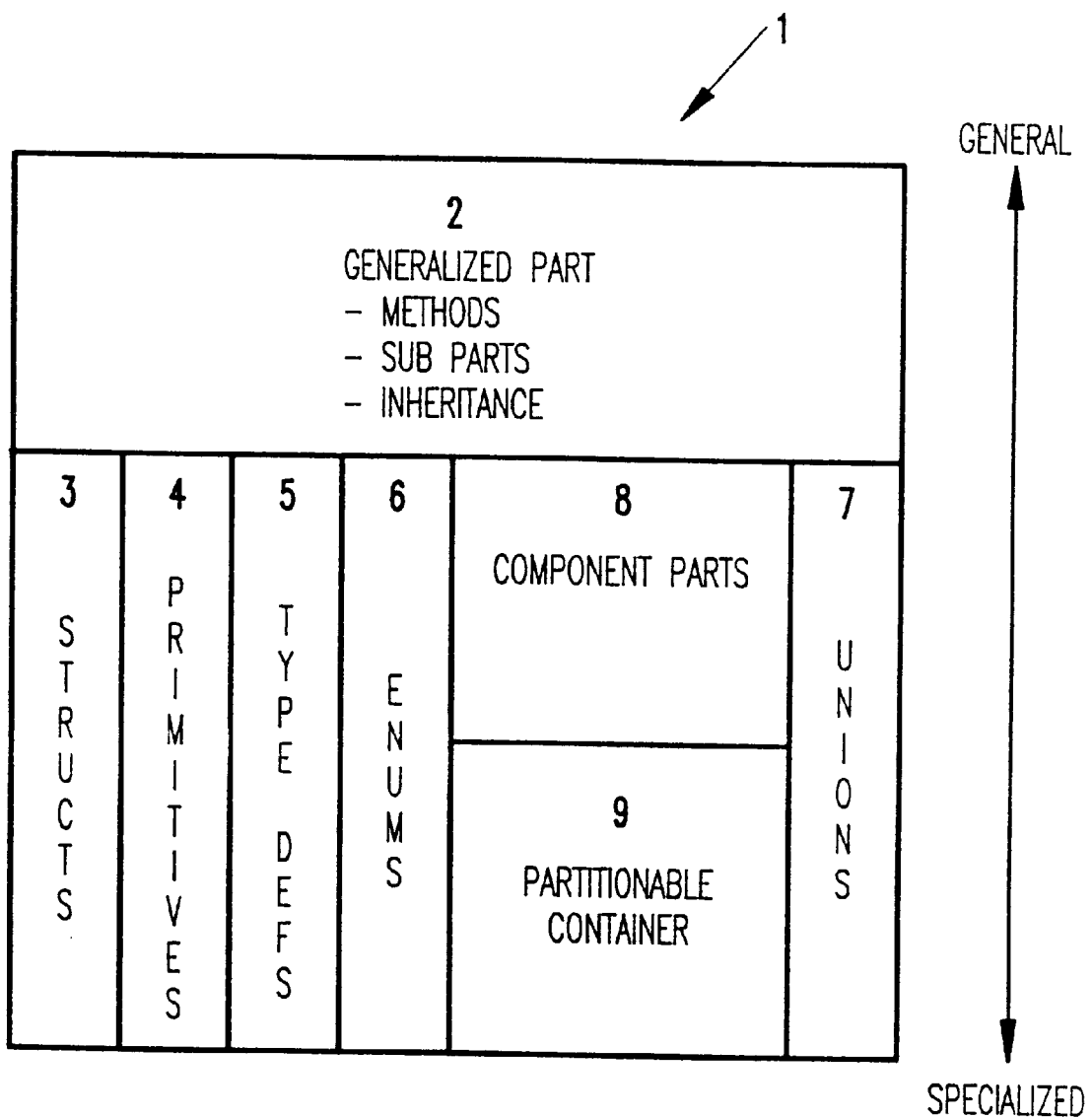
FIG. 1 is a schematic drawing illustrating categories of metadata layered "parts" according to the preferred embodiment of the invention.

FIG. 3 is a class diagram, expressed in C++, of an IDE element base class, according to the preferred embodiment of the invention.

DETAILED DESCRIPTION OF A PREFERRED EMBODIMENT OF THE INVENTION

The preferred embodiment has been implemented as an open data model that provides source code or the common intermediate form accessible and extensible by all development tools that wish to work with a program. The data model is language independent which allows cross system source sharing. This model could be use to drive a code generator.

In the preferred embodiment, the data model provides a metadata store in support of a tool integration framework which is fully described in our concurrently filed, copending application Ser. No. 08/950,117, titled "An Object Oriented Framework Mechanism Providing Common Object Relationship and Context Management For Multiple Tools" (IBM Docket No. CA997-002).

In order to handle the requirements of the range of applications, from basic source programming to component based visually constructed applications, the data model of the present invention provides a shared metadata store in which the development information is layered. Each layer defines the common behaviour required at that level. Tools using the model start with a behaviour at a given layer and extend it as appropriate for the particular tool.

The data model captures information about various "elements" required during the development of an application. This includes information about the logical pieces of an overall application, such as folders, files and application parts. At its highest level, the data model generally defines the common behaviour required to be recognized as an element within the integrated development environment. This includes the ability for rendering the element, exposing its content (if appropriate), as well a triggering any of its actions.

This is roughly equivalent to other currently available application development information stores that map to a file system (source files and directories/folders). However the data model of the invention is further extended into key areas:

1. recognition of namespaces as distinct from folder containment; and
2. refinement of the application "part" concept into distinct part layers.

Rather than leaving it to the developer to recognize project folder containment and application part naming at the source or force the naming relationships to be the same as the folder containment, the data model of the present invention defines name scope as a "parallel" set of relationships to that of containment. This allows, for example, a part containing a C++ class A::B::C to be properly defined as a series of nested naming scopes, while at the same time allowing the same part to be used (through containment or linking) within several project folders.

The data model of the invention supports application definition and assembly from parts. According to the invention, a part is a self contained piece of an overall application that is distinct from the source files that contain the source code for the part. Depending on the programming environment, a part may in fact reference several files (for example in C++, the .hpp and .cpp files) but a part is not a file container. Within the data model of the invention, a part is a separately editable piece of application definition (metadata) distinct from any source files that may be associated with the part or generated from the part definition. As will be discussed in more detail below, within the data model of the invention, all parts are named and name scoped. A part (based on its implementation) may itself be a name scope for other parts, as in, for example, C++ nested classes.

The layering approach to a metadata store is schematically illustrated in FIG. 1. The semantics of a part 1 are layered in a spectrum in the data model from parats used by general use tools to parts used by increasingly specialised tools. At the general end of the spectrum, Generalised Parts 2 are base parts corresponding to the semantics of a constructed type within the target language. The list of generalised parts include subparts and encapsulated behaviour such as methods and inheritance. Typically, these correspond to a class definition for object oriented languages such as C++ and JAVA™, or to some form of a structure, such as in COBOL (JAVA is trademark of Sun Microsystems, Inc.).

A degenerate case of the generalised parts are various types supported by the data model. These types are further specialisations of generalised parts that capture or encapsulate the following concepts: fundamental types (eg. int, char) are represented by Primitive Types 4; records are represented by Structs 3; overlaid memory structures are represented by Unions 7; named cardinal values are represented by Enumerations (Enums) 6; and aliased parts are represented by Type Definitions (Type Def) 5.

Component parts 8 are base name parts with the additional support of a component model. A component part, regardless of its ultimate source language implementation, defines its external behaviour as a set of attributes which are called "properties", events raised by the part and actions which are externally triggerable behaviour. The data model captures this information as a component part and allows the generation of the appropriate target component model (eg JAVABEANS™, IBM® VisualAge VBE model, etc.). (JAVABEANS is a trademark of Sun Microsystems, Inc. and IBM is a registered trademark of International Business Machine Corp.) Within an IDE, this typically represents the level of support used by higher order "builder" tools. Component parts are referred to within the data model as "builder consumable" parts, in relation to FIG. 2.

Partitionable containers 9 are component parts that expose part of their internal behaviour to a level that allows repartitioning of the part for distribution. Through the data model, these parts expose interactions among their aggregated subparts, as well as interactions across parts. This level of information is used to capture the application distribution structure regardless of the target distribution mechanism.

Depending on its specific requirements, a tool selects the appropriate level of parts support to store its tool part metadata within the data model. Shared behaviour is inherited from the data model, and the tool adds it own extensions as appropriate. Typically, these extensions are opaque tool-specific properties. For example, this structure allows a data access part which is a component part containing information about access to a data base, to be consumed by a user-interface (UI) builder producing a UI part. The UI builder is a composed part containing the data access part and UI controls. This can subsequently be partitioned into a client part (UI and server call) and server part (server logic) and access to data base. This is all done by editing the data model information. The same data model information can be used to generate a JAVA™ Bean with JAVA™ remote method invocation (RMI) call to server and JAVA™ Database Connectivity (JDBC™) access to data base, or a C++ client with DCE access to a server with a local data base (JDBC is a trademark of Sun Microsystems, Inc.).

Figure 2:
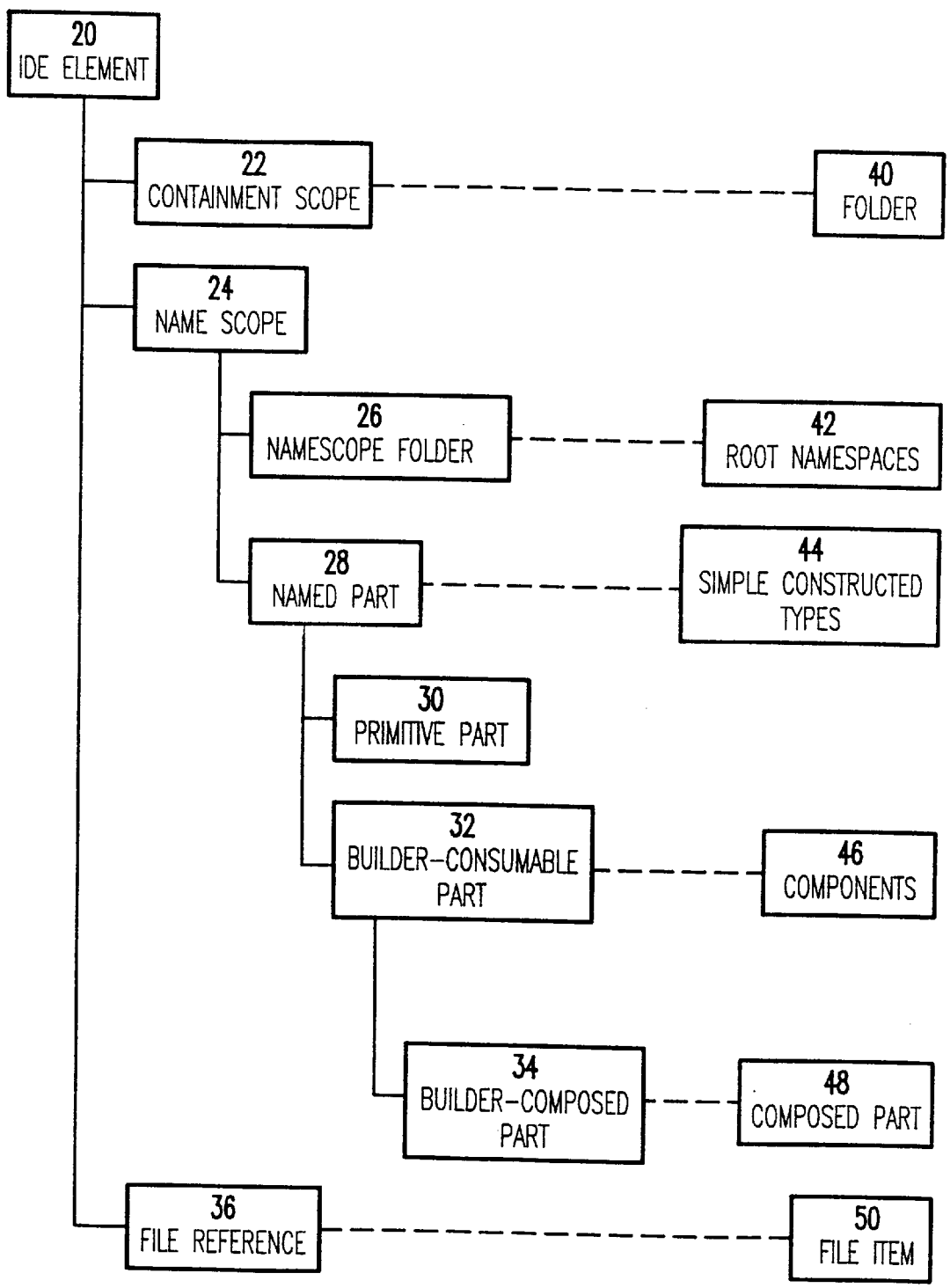
FIG. 2 is a tree diagram illustrating the model layer hierarchy according to the preferred embodiment of the invention.

The preferred embodiment is implemented in an object oriented programing hierarchy which facilitates the sharing of parts through inheritance. FIG. 2 illustrates an approach to data model layers according to the preferred embodiment providing a class definition at each layer and illustrating how the class of metadata, at that level in the hierarchy, can be used by tools.

The most abstract base class, the IDE Element 20, is provided for the implementation of an IDE tree view. Using mostly pure virtual methods, it permits the tree view to display the contents of the model, launch actions against its elements (nodes), and attempts structural changes against the hierarchy without regard to the content details. Success of these operations (especially structural changes) depends on the supported semantics of the individual tree element derivations.

The common behaviour of rendering of tree nodes is defined so that each element within the tree view will show its name, icon, indication whether element is owned or linked, and an indication whether the element can be further expanded.

The basis for expanding branches of the tree view is the ability to list the contents of any one IDE element as its contained element. Thus, the IDE Element base class 20 provides a common behaviour to expose content. This is illustrated, in the preferred embodiment, in the sample C++ header file for an IDE Element base class set out in FIG. 3. Each derived IDE element determines what constitutes its content. Unlike most other relationships supported within the model, the "contains" relationships have a requirement for supporting direct access to its element by name, as well as providing cursor based access that maintains ordering. This is required because the tree view is expected to allow the nodes within the tree to be reordered using drag and drop operations or the selection of reordering actions. The relative element order is maintained within the model. A specific example of this is a visual builder pallet containing pallet categories, each of which contains parts available to the builder. Frequently used items would be expected to be placed at the top of the list to reduce the need for scrolling.

The model also provides a set of methods at this level of abstraction that allow modifications to the tree structure without regard to element details. The success of these operations is determined by the derived implementations. There are two mechanisms for constructing container relationships:

1. Ownership relationships indicating aggregation of the sub elements within the subject parts. Owned elements are destructed if orphaned by a parent; and 2. Reference relationships indicating soft links or shadow links to a sub element owned or aggregated elsewhere within the tree.

In all cases, a removal action on one element propagates the removal action across ownership relationship but not reference relationships. That is owned elements are destructed but in the case of linked elements only the link is removed. It should be noted that the data model does not enforce a single owning parent rule, although a great majority of owning relationships are expected to be of this type. In an owning relationship, the child is destructed when any parent is destructed or when the child is explicitly orphaned by any owning parent.

Since derived implementation may reject attempt to change the contents of the tree nodes, methods are provided to check if the desired operation is allowed. Even if the operation is allowed it may still fail for other reasons. The decision to accept or reject a content action is up to the object that is the recipient of the content, that is the parent object would be asked for permission not the child object.

In the preferred embodiment, the IDE Element base class 20 provides additional common behaviour, including:

1. action support: the model provides a mechanism for triggering edit actions against the model objects. The term "edit" simply means any tool specific action. Each tool is expected to provide an implementation of the edit methods in their concrete class derivations.

2. code generation support: each element can cause source output to be generated for the model metadata. A default implementation of generate ( ) is to simply return. If output must be produced, the derived implementation need to over ride the generate ( ) method. This generate ( ) is a context sensitive method.

3. "dirty" part support: an IDE element can be marked by a tool as being "dirty". This indicates that the source code for the element must be regenerated because it or its dependencies have changed. The model provides a method to manage this indication shown in FIG. 3.

4. associated file operation: the model makes the distinction between contained and associated files. A contained file is simply an IDE element that is structurally related to its container. An example is the source files contained within a project group folder. Contained files are manipulated using the content and structural operations discussed earlier in this section. An associate file is a file reference that is required example of an associated file or header files required in order to use a part, or source files generated from a group or a part. When most cases these are not actually contained within the element with which they are associated.

At the next level of abstraction are the Containment Scope 22 and Name Scope 24 base classes. As mentioned above, containment and part naming are parallel, and therefore, independent relationships.

On the containment scoping side, the base class 22 represents a generalized grouping construct. In its default form, it allows an arbitrary collection of groups, parts and files that can be owned or linked. Also by default, its content can be "edited" through the tree view or a tool action. This is a general "folder" 40 construct within the IDE.

The base Name Scope class 24 defines support for nested name scopes within the preferred embodiment model. Its primary intent is scoping of name parts. The Name Scope Folder 26 and Named classes are used to construct the hierarchy reflecting the definitional scopes of the parts. This hierarchy is parallel to that of containment, to allow name scoping to be independent of part containment.

The Namescope Folder class 26 is in all aspects identical to the Containment Scope class 22, except it also defines a name scope. Namescope Folder 26 is to allow name scope other than name groups and the derivations and parts in their derivations. This is a general names based construct within the IDE.

Scoped names are constructed by assembling a nested set of scopes using the group and part constructs. Model, the singleton basis of the structure, plays the role of the global naming scope. Constructors are provided on group and part derivations that allow specification of the parent name scope for the item being constructed. If a name scope for these objects are not specified the constructed objects are defined at a global scope, that is created below model in the name scoping hierarchy.

In general, tree nodes also act as local name scopes for the immediate children they contain. By default, children of an element must have unique names. Since part names are globally unique (under the name scoping mechanism), the default model implementation will allow a part to be created independent of any non-part construct that may exist with the same name but will not allow a part to be stored in an element container if the container already has a non-part child with the same name.

Continuing in the Name Scope hierarchy, the Named Part class 28 represents a generalized part construct 44. By default, its content is editable only via an explicit tool action. The part class is not a folder, although it may be defined as an aggregate of sub-parts.

The Named Part class models are based constructed type, and permits the data model to capture information about model defined attributes and properties, inheritance, data member and sub-part aggregation, and externally triggerable behaviour or methods. All parts can act as name scopes for other parts.

As mentioned above, Primitive Part 30 is a degenerate case of the base Named Part 28. Primitive Part 30 are various primitive types such as integer, character, float, Boolean, supported by the data model.

The Builder-Consumable Part class 32 implements semantics of a component part. These builder parts are consumable by the visual composition editor (graphical composer). They are defined in terms of attributes, events and actions. At generation time, Builder-Consumable parts feature maps to the appropriate target component model 46.

The Builder-Composed Part class 34 is a partition class that defines the semantics of a partitionable composed part, as distinct from a distributable part. It should be pointed out that a part is distributable if builder tools are allowed to use a proxy to access a remote instance of the part. In the data model, this is indicated by a part property. A part is partitionable if distribution support can effectively rearrange the part content across two or more parts. Concrete parts derived from this class map to composed parts 48 and are partitionable by distribution support.

Local associations among a part's sub-parts are captured within the part definition. They represent sub-part interactions. Methods are provided to handle the repartitioning of a part which occurs by redeploying a sub-part from one part to another. If this redeployment is successful, a distributed association between the parts is created. These represent distributed cross part interactions between sub parts of different parts.

A final base class is the File Reference class 36 which represents a generalized file reference construct. It is a symbolic pointer to a file item 50 in the file system.

Embodiments of and modifications to the described invention that would be obvious to those skilled in the art are intended to be covered by the appended claims.

We claim:

1. A computing system for storing and retrieving metadata in a container for common access tool data in an object oriented programming environment, having a hierarchical structure, comprising:

means for storing computer readable data and computer code;

a first code section of said computer code comprising a plurality of simple constructed types that contain subparts and encapsulated behaviour;

a second code section of said computer code comprising a plurality of components that contain properties of a target language;

a third code section of said computer code comprising a plurality of composed parts that permit partitioning for distribution; and means for processing said first, second and third code sections stored in said storage means, enabling a plurality of computer implemented design tools to share a representation of a design, implementation and distribution of an application, wherein said data is organized in said storage means for direct manipulation by design tools.

2. A computing system for storing and retrieving metadata for common access tool data in an object oriented programming environment, comprising:

means for storing computer readable data and computer code;

a first code section of said computer code comprising a single base class defining common behaviour for elements in the tool data;

at least one additional code section of said computer code, each said at least one additional code section comprising a separate abstract class hierarchy, inheriting from the single base class, to define name scopes and containment for the tool data; and means for processing said first code section and said at least one additional code section, said code sections stored in said storage means, enabling a plurality of computer implemented tools to access common tool data defined by said code sections.

3. A metadata store, according to claim 2, wherein the abstract class hierarchy to define name scopes comprises:

a part class representing a generalized part construct adapted to contain subparts and encapsulated behaviour.

4. A metadata store, according to claim 3, wherein the abstract class hierarchy to define name scopes comprises:

a component class adapted to implement properties of a target language.

5. A metadata store, according to claim 3, wherein the abstract class hierarchy to define name scopes comprises:

a partition class adapted to contain definitions of part partition semantics.

6. A metadata store, according to claim 3, wherein the abstract class hierarchy to define name scopes comprises:

a component class adapted to implement properties of a target language.

7. A metadata store, according to claim 2, wherein the abstract class hierarchy to define name scopes comprises:

a component class adapted to implement properties of a target language.

8. A metadata store, according to claim 2, wherein the abstract class hierarchy to define name scopes comprises:

a partition class adapted to contain definitions of part partition semantics.

9. A metadata store, according to claim 2, wherein the abstract class hierarchy to define name scopes stratifies the tool data into a layered structure, comprising:

simple constructed types that contain subparts and encapsulated behaviour;

components that contain properties of a target language; and composed parts that permit partitioning for distribution.

10. A computer implemented method for storing metadata for common access tool data in an object oriented programming environment, said method comprising the steps:

identifying a single base class, defining common behaviour for elements in the tool data;

identifying at least one separate abstract class hierarchy, inheriting from said single base class, to define name scopes and containment for the tool data; and representing said identified base classes and said at least one class hierarchy in object oriented computer code, enabling a plurality of computer implemented tools to access common tool data as represented in said computer code.

11. A computer implemented method as recited in claim 10, wherein said abstract class hierarchy to define name scopes comprises:

a part class representing a generalized part construct adapted to contain subparts and encapsulated behaviour.

12. A computer implemented method as recited in claim 11, wherein said abstract class hierarchy to define name scopes comprises:

a component class adapted to implement properties of a target language.

13. A computer implemented method as recited in claim 11, wherein said abstract class hierarchy to define name scopes comprises:
a partition class adapted to contain definitions of part partition semantics.

14. A computer implemented method as recited in claim 11, wherein said abstract class hierarchy to define name scopes comprises:
a component class adapted to implement properties of a target language.

15. A computer implemented method as recited in claim 10, wherein said abstract class hierarchy to define name scopes comprises:
a component class adapted to implement properties of a target language.

16. A computer implemented method as recited in claim 10, wherein said abstract class hierarchy to define name scopes comprises:
a partition class adapted to contain definitions of part partition semantics.

17. A computer implemented method as recited in claim 10, wherein said abstract class hierarchy to define name scopes stratifies the tool data into a layered structure, comprising:
simple constructed types that contain subparts and encapsulated behaviour;
components that contain properties of a target language; and
composed parts that permit partitioning for distribution.

18. A computer readable medium containing computer code for storing metadata for common access tool data in an object oriented programming environment, enabling a plurality of computer implemented tools to access common tool data as represented in said computer code, the code implementing the steps of:
identifying a single base class, defining common behaviour for elements in the tool data; and
identifying at least one separate abstract class hierarchy, inheriting from said single base class, to define name scopes and containment for the tool data.

* * * * *